(12) United States Patent
McCreary et al.

(10) Patent No.: US 12,353,964 B2
(45) Date of Patent: Jul. 8, 2025

(54) CROSS-ENTITY SIMILARITY DETERMINATIONS USING MACHINE LEARNING FRAMEWORKS

(71) Applicant: Optum, Inc., Minnetonka, MN (US)

(72) Inventors: Daniel G. McCreary, St. Louis Park, MN (US); Parker J. Erickson, Plymouth, MN (US); Mark G. Megerian, Rochester, MN (US); Alex Li, Maple Grove, MN (US)

(73) Assignee: OPTUM, INC., Minnetonka, MN (US)

( * ) Notice: Subject to any disclaimer, the term of this patent is extended or adjusted under 35 U.S.C. 154(b) by 1022 days.

(21) Appl. No.: 17/302,481

(22) Filed: May 4, 2021

(65) Prior Publication Data

US 2022/0358395 A1 Nov. 10, 2022

(51) Int. Cl.
*G06N 20/00* (2019.01)
*G06N 5/02* (2023.01)
*G06N 5/04* (2023.01)

(52) U.S. Cl.
CPC ............. *G06N 20/00* (2019.01); *G06N 5/027* (2013.01); *G06N 5/04* (2013.01)

(58) Field of Classification Search
CPC .......... G06N 20/00; G06N 5/027; G06N 5/02; G06N 5/04
USPC ......................................................... 706/12
See application file for complete search history.

(56) References Cited

U.S. PATENT DOCUMENTS

| | | | |
|---|---|---|---|
| 8,626,690 B2 | 1/2014 | Aharon et al. | |
| 9,805,307 B2 | 10/2017 | Kang et al. | |
| 10,535,007 B2 | 1/2020 | Kang et al. | |
| 2013/0231953 A1 | 9/2013 | Ebadollahi et al. | |
| 2014/0214945 A1* | 7/2014 | Zhang | H04L 67/306 709/204 |
| 2018/0196873 A1 | 7/2018 | Yerebakan et al. | |
| 2018/0268024 A1 | 9/2018 | Bandyopadhyay et al. | |
| 2019/0198178 A1 | 6/2019 | Dey et al. | |
| 2019/0251480 A1* | 8/2019 | Garcia Duran | G06N 20/20 |

(Continued)

FOREIGN PATENT DOCUMENTS

| | | |
|---|---|---|
| CN | 107656952 A | 2/2018 |
| EP | 3499386 A1 | 6/2019 |

OTHER PUBLICATIONS

Dong et al., "Metapath2vec: Scalable Representation Learning for Heterogeneous Networks", In Proceedings of KDD'17, Aug. 13-17, 2017, pp. 135-144. (Year: 2017).*

(Continued)

*Primary Examiner* — Hwei-Min Lu
(74) *Attorney, Agent, or Firm* — Alston & Bird LLP

(57) ABSTRACT

There is a need for faster and more accurate predictive data analysis steps/operations. This need can be addressed by, for example, techniques for efficient predictive data analysis steps/operations. In one example, a method includes identifying a first predictive entity embedding for the first predictive entity and a second predictive entity embedding for a second predictive entity; determining, using a similarity determination machine learning model and based at least in part on the first predictive entity embedding and the second predictive entity embedding, a predicted cross-entity similarity measure; and performing one or more prediction-based actions based at least in part on the predicted cross-entity similarity measure.

20 Claims, 11 Drawing Sheets

(56) References Cited

U.S. PATENT DOCUMENTS

| | | | |
|---|---|---|---|
| 2019/0259041 A1* | 8/2019 | Jackson | G06F 16/288 |
| 2020/0042857 A1 | 2/2020 | Fang et al. | |
| 2020/0057946 A1* | 2/2020 | Singaraju | G06N 7/01 |
| 2021/0056428 A1* | 2/2021 | Palowitch | G06F 17/10 |
| 2021/0073289 A1* | 3/2021 | Hunter | G06N 3/08 |
| 2021/0081717 A1* | 3/2021 | Creed | G06N 3/047 |
| 2021/0312134 A1* | 10/2021 | Creed | G06N 20/00 |

OTHER PUBLICATIONS

Liang et al., "Predicting biomedical relationships using the knowledge and graph embedding cascade model", PLOS ONE 14(6): e0218264, Jun. 13, 2019, pp. 1-23. (Year: 2019).*

Gliozzo et al., "Network modeling of patients' biomolecular profiles for clinical phenotype/outcome prediction", Scientific Reports, 10: 3612, Feb. 27, 2020, pp. 1-15 with Supplementary Information pp. 1-25. (Year: 2020).*

Jia et al., "A patient-similarity-based model for diagnostic prediction", International Journal of Medical Informatics 135 (2020) 104073, Mar. 2020, pp. 1-8. (Year: 2020).*

Bianchi et al., "Knowledge Graph Embeddings and Explainable AI", arXiv: 2004.14843, Apr. 30, 2020. (Year: 2020).*

Gerritse et al., "Graph-Embedding Empowered Entity Retrieval", arXiv: 2005.02843, May 6, 2020. (Year: 2020).*

Bai et al., "Entity Thematic Similarity Measurement for Personal Explainable Searching Services in the Edge Environment", IEEE Access, vol. 8, Aug. 4, 2020, pp. 146220-146232. (Year: 2020).*

Liu et al, "Heterogeneous Similarity Graph Neural Network on Electronic Health Records", 2020 IEEE International Conference on Big Data (Big Data), Dec. 2020, pp. 1196-1205. (Year: 2020).*

Wu et al., "Leveraging graph-based hierarchical medical entity embedding for healthcare applications", Scientific Reports, 11:5858, Mar. 12, 2021, pp. 1-13 with supplementary information pp. 1-3. (Year: 2021).*

Memarzadeh et al., "Heterogeneous electronic medical record representation for similarity computing", arXiv ID: 2104.14229, v1, Apr. 29, 2021, pp. 1-32. (Year: 2021).*

Abu-El-Haija, Sami et al. "N-GCN: Multi-Scale Graph Convolution for Semi-Supervised Node Classification," In Uncertainty in Artificial Intelligence, Aug. 6, 2020 (11 pages). PMLR.

Qian, Buyue et al. "A Relative Similarity Based Method for Interactive Patient Risk Prediction," Data Mining and Knowledge Discovery, vol. 29, No. 4, Sep. 9, 2014, (24 pages), DOI: 10.1007/s10618-014-0379-5.

Zhu, Zihao et al. "Measuring Patient Similarities Via a Deep Architecture With Medical Concept Embedding," arXiv: 1902.03376v1 [stat.ML] Feb. 2, 2019, (10 pages).

* cited by examiner

| Random Walk | Patient | Patient | Patient | Patient |
|---|---|---|---|---|
| 1 | 5563242 | 8154477 | 5334597 | ... |
| 2 | 5334597 | 7473556 | 6661920 | ... |
| ... | | | | |

FIG. 8

TOP SIMILAR PATIENTS TO MEMBER 12345678

1100

| MEMBER ID | Patient Demographic Notes | Dept. | Current Clinician |
|---|---|---|---|
| 23456789 | 63 Year Old Male With Hypertension | Oncology | Dr. John |
| 34567891 | 65 Year Old Female With Hypertension And Diabetes | Oncology | Dr. Jane |
| 34567890 | 70 Year Old Male With Coronary Artery Disease And Atrial Fibrilation | Oncology | Dr. John |

CLICK TO SORT →

FIG. 11

CROSS-ENTITY SIMILARITY DETERMINATIONS USING MACHINE LEARNING FRAMEWORKS

BACKGROUND

Various embodiments of the present invention address technical challenges related to performing predictive data analysis steps/operations that are configured to determine predicted cross-entity similarity measures between predictive entity pairs (e.g., a first predictive entity and a second predictive entity) and disclose various innovative techniques for improving speed, efficiency and/or reliability of predictive data analysis systems.

BRIEF SUMMARY

In general, embodiments of the present invention provide methods, apparatuses, systems, computing devices, computing entities, and/or the like for performing predictive data analysis steps/operations that are configured to determine predicted cross-entity similarity measures between predictive entity pairs.

In accordance with one aspect, a method for determining a predicted cross-entity similarity measure between a first predictive entity of a plurality of predictive entities and a second predictive entity of the plurality of predictive entities, the computer-implemented method comprising: identifying, by one or more computer processors, a first predictive entity embedding for the first predictive entity and a second predictive entity embedding for the second predictive entity, wherein: the first predictive entity embedding and the second predictive entity embedding are generated using an entity encoding machine learning model, the entity encoding machine learning model is configured to, for each predictive entity of the plurality of predictive entities: (i) process a graph-based feature set for the predictive entity using a graph node embedding sub-model of the entity encoding machine learning model to generate a graph-based entity embedding for the predictive entity, and (ii) process the graph-based entity embedding for the predictive entity to generate the predictive entity embedding for the predictive entity, each graph-based feature set for a predictive entity of the plurality of predictive entities is determined based at least in part on a group of graph node sequences for the predictive entity that are determined using a predefined number of random walks for the predictive entity, and each predefined number of random walks for a predictive entity of the plurality of predictive entities is performed across an entity relationship graph starting from a graph node of the entity relationship graph that corresponds to the predictive entity; determining, by the one or more computer processors, using a similarity determination machine learning model and based at least in part on the first predictive entity embedding and the second predictive entity embedding, the predicted cross-entity similarity measure; and performing, by the one or more computer processors, one or more prediction-based actions based at least in part on the predicted cross-entity similarity measure.

In accordance with another aspect, an apparatus determining a predicted cross-entity similarity measure between a first predictive entity of a plurality of predictive entities and a second predictive entity of the plurality of predictive entities, the apparatus comprising at least one processor and at least one memory including program code, the at least one memory and the program code configured to, with the processor, cause the apparatus to at least: identify a first predictive entity embedding for the first predictive entity and a second predictive entity embedding for the second predictive entity, wherein: the first predictive entity embedding and the second predictive entity embedding are generated using an entity encoding machine learning model, the entity encoding machine learning model is configured to, for each predictive entity of the plurality of predictive entities: (i) process a graph-based feature set for the predictive entity using a graph node embedding sub-model of the entity encoding machine learning model to generate a graph-based entity embedding for the predictive entity, and (ii) process the graph-based entity embedding for the predictive entity to generate the predictive entity embedding for the predictive entity, each graph-based feature set for a predictive entity of the plurality of predictive entities is determined based at least in part on a group of graph node sequences for the predictive entity that are determined using a predefined number of random walks for the predictive entity, and each random walk of the predefined number of random walks for a predictive entity of the plurality of predictive entities is performed across an entity relationship graph starting from a graph node of the entity relationship graph that corresponds to the predictive entity; determine, using a similarity determination machine learning model and based at least in part on the first predictive entity embedding and the second predictive entity embedding, the predicted cross-entity similarity measure; and perform one or more prediction-based actions based at least in part on the predicted cross-entity similarity measure.

In accordance with yet another aspect, a computer program product for determining a predicted cross-entity similarity measure between a first predictive entity of a plurality of predictive entities and a second predictive entity of the plurality of predictive entities, the computer program product comprising at least one non-transitory computer-readable storage medium having computer-readable program code portions stored therein, the computer-readable program code portions configured to: identify a first predictive entity embedding for the first predictive entity and a second predictive entity embedding for the second predictive entity, wherein: the first predictive entity embedding and the second predictive entity embedding are generated using an entity encoding machine learning model, the entity encoding machine learning model is configured to, for each predictive entity of the plurality of predictive entities: (i) process a graph-based feature set for the predictive entity using a graph node embedding sub-model of the entity encoding machine learning model to generate a graph-based entity embedding for the predictive entity, and (ii) process the graph-based entity embedding for the predictive entity to generate the predictive entity embedding for the predictive entity, each graph-based feature set for a predictive entity of the plurality of predictive entities is determined based at least in part on a group of graph node sequences for the predictive entity that are determined using a predefined number of random walks for the predictive entity, and each random walk of the predefined number of random walks for a predictive entity of the plurality of predictive entities is performed across an entity relationship graph starting from a graph node of the entity relationship graph that corresponds to the predictive entity; determine, using a similarity determination machine learning model and based at least in part on the first predictive entity embedding and the second predictive entity embedding, the predicted cross-entity similarity measure; and perform one or more prediction-based actions based at least in part on the predicted cross-entity similarity measure.

BRIEF DESCRIPTION OF THE DRAWINGS

Figure 1:
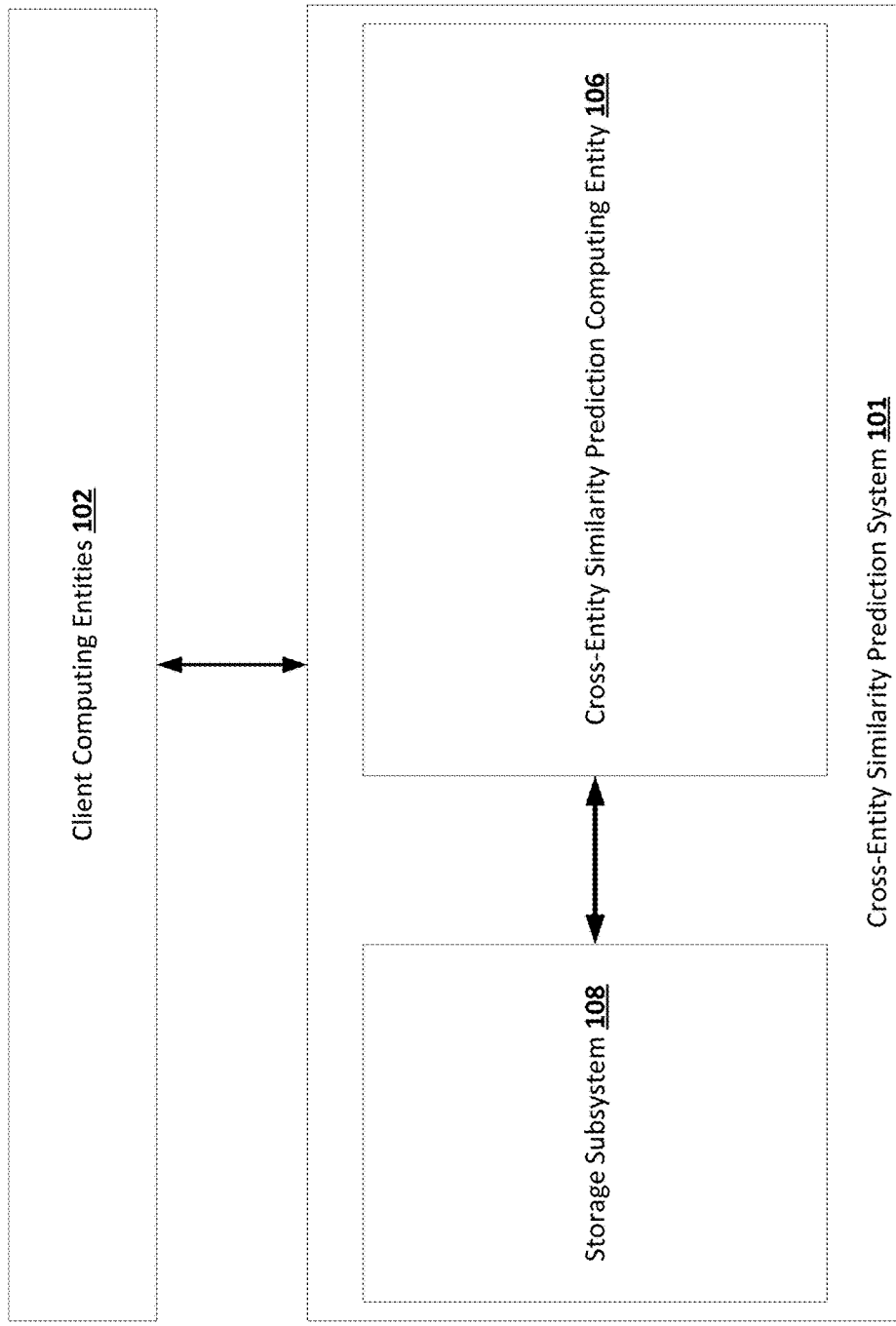
Figure 2:
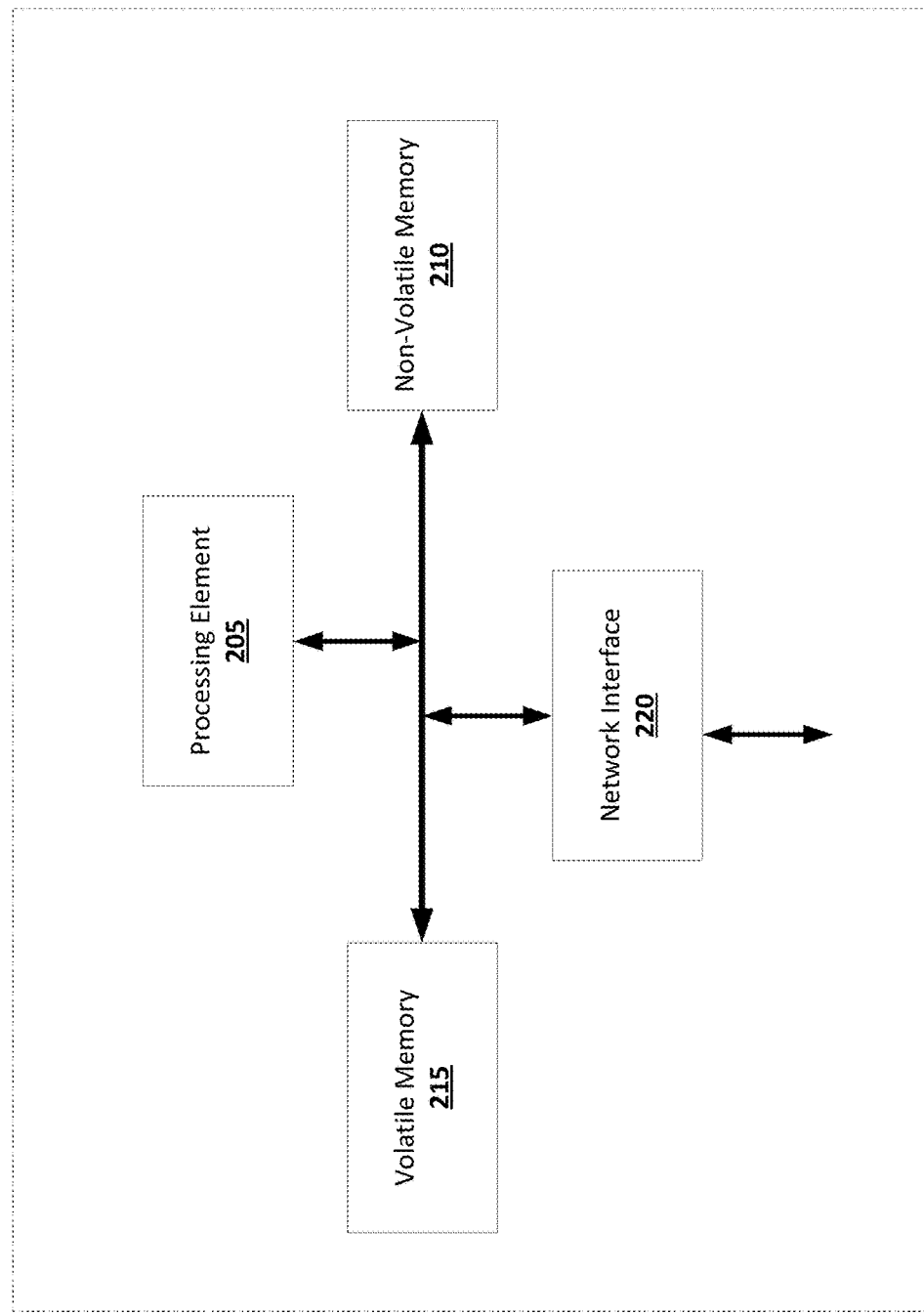
Figure 3:
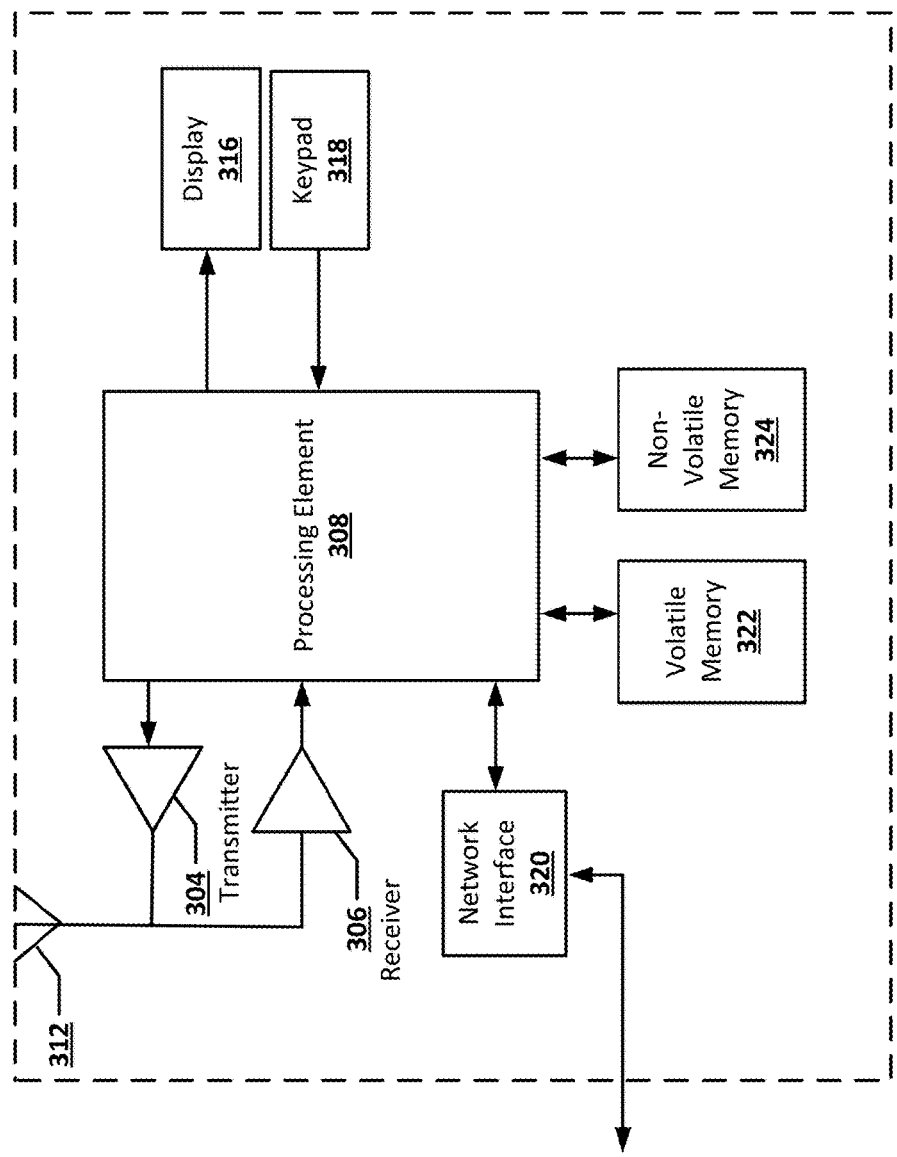
Figure 4:
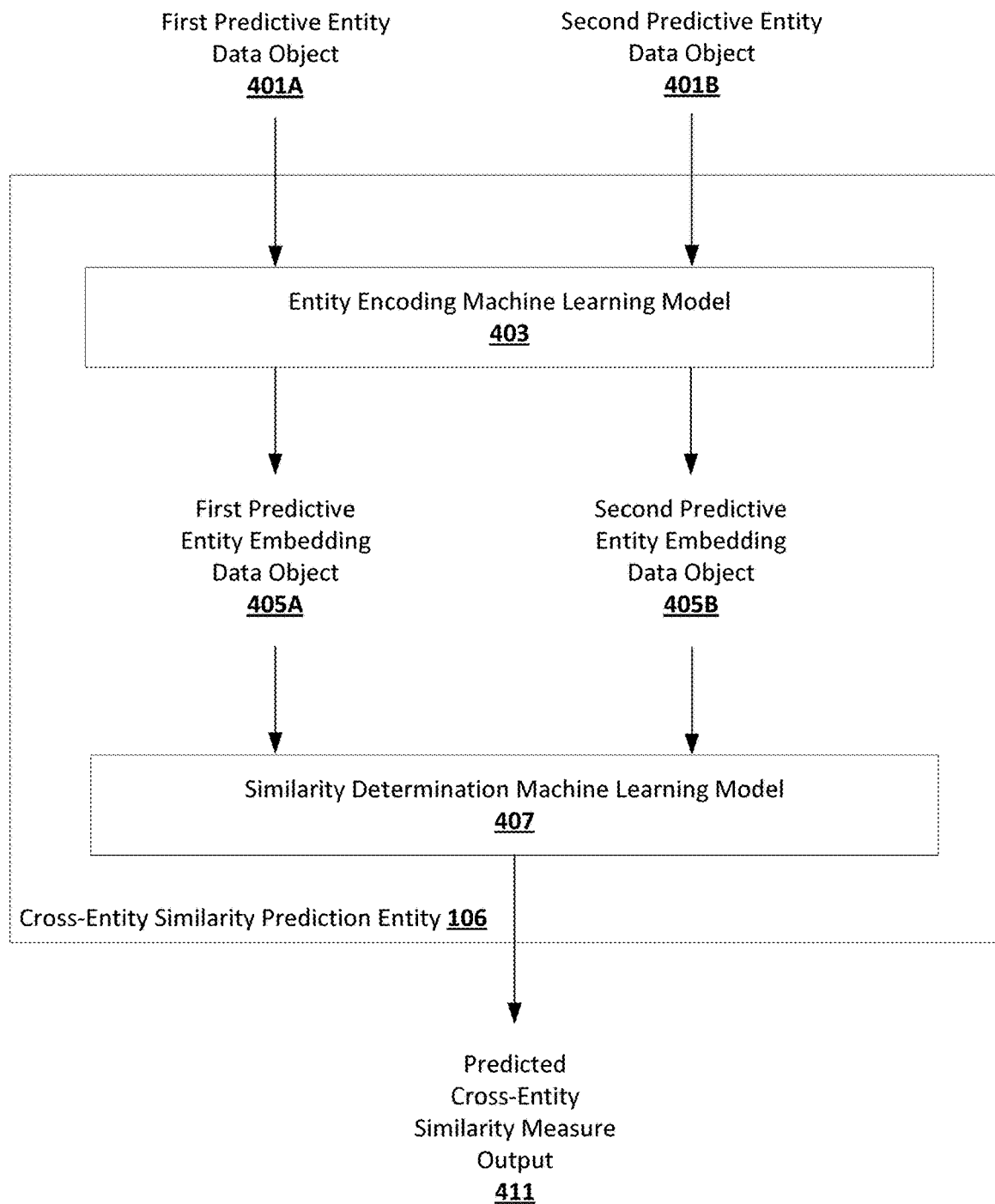
Figure 5:
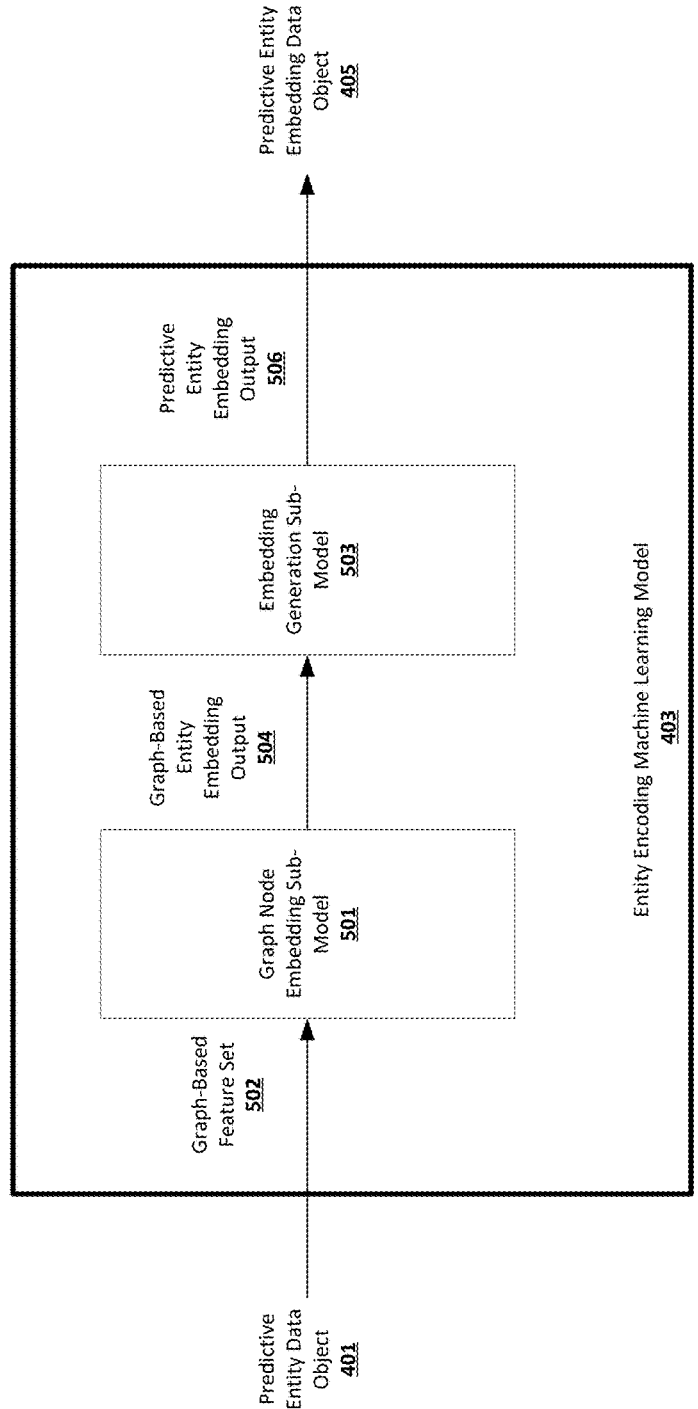
Figure 6:
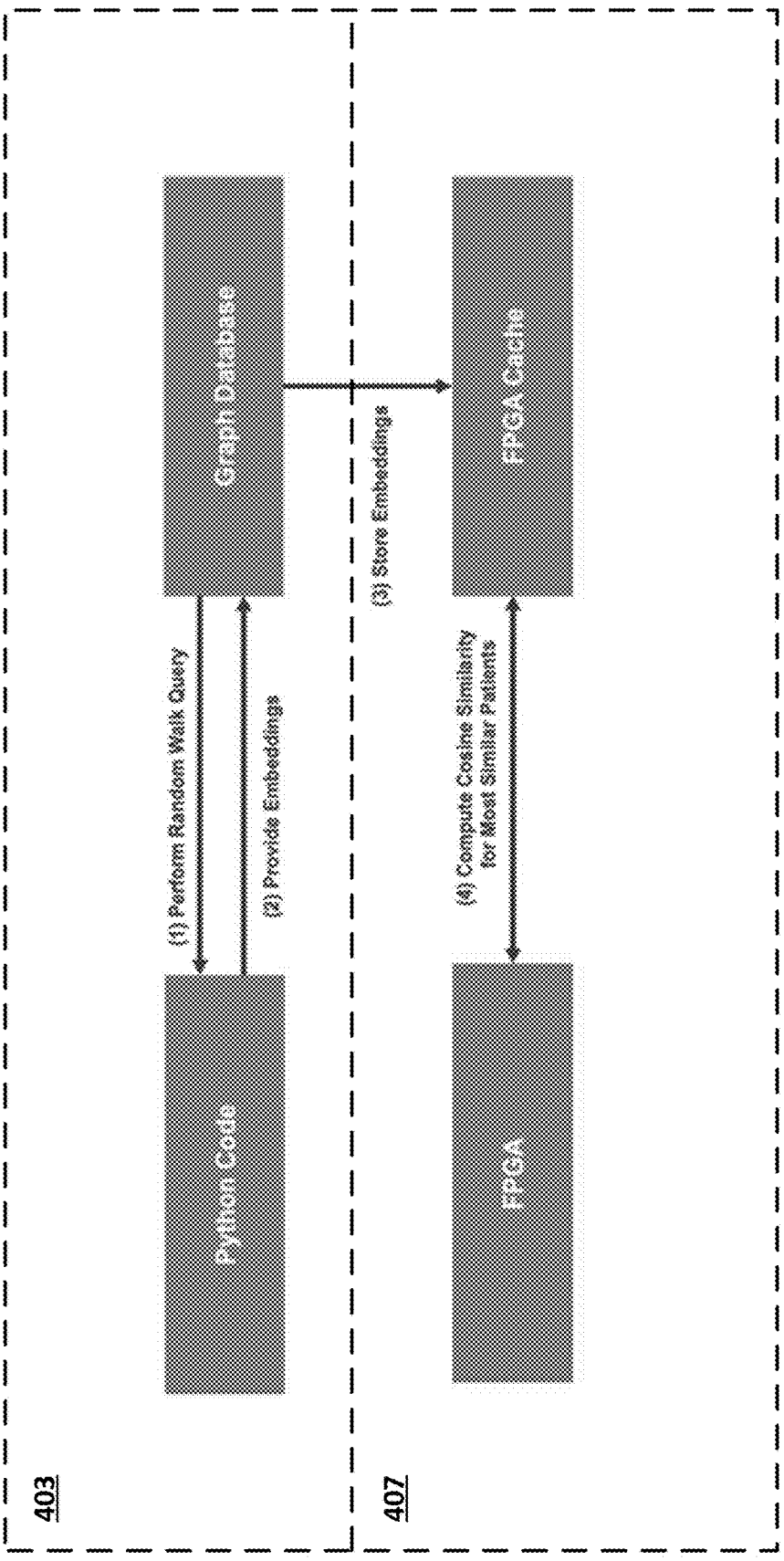
Figure 7:
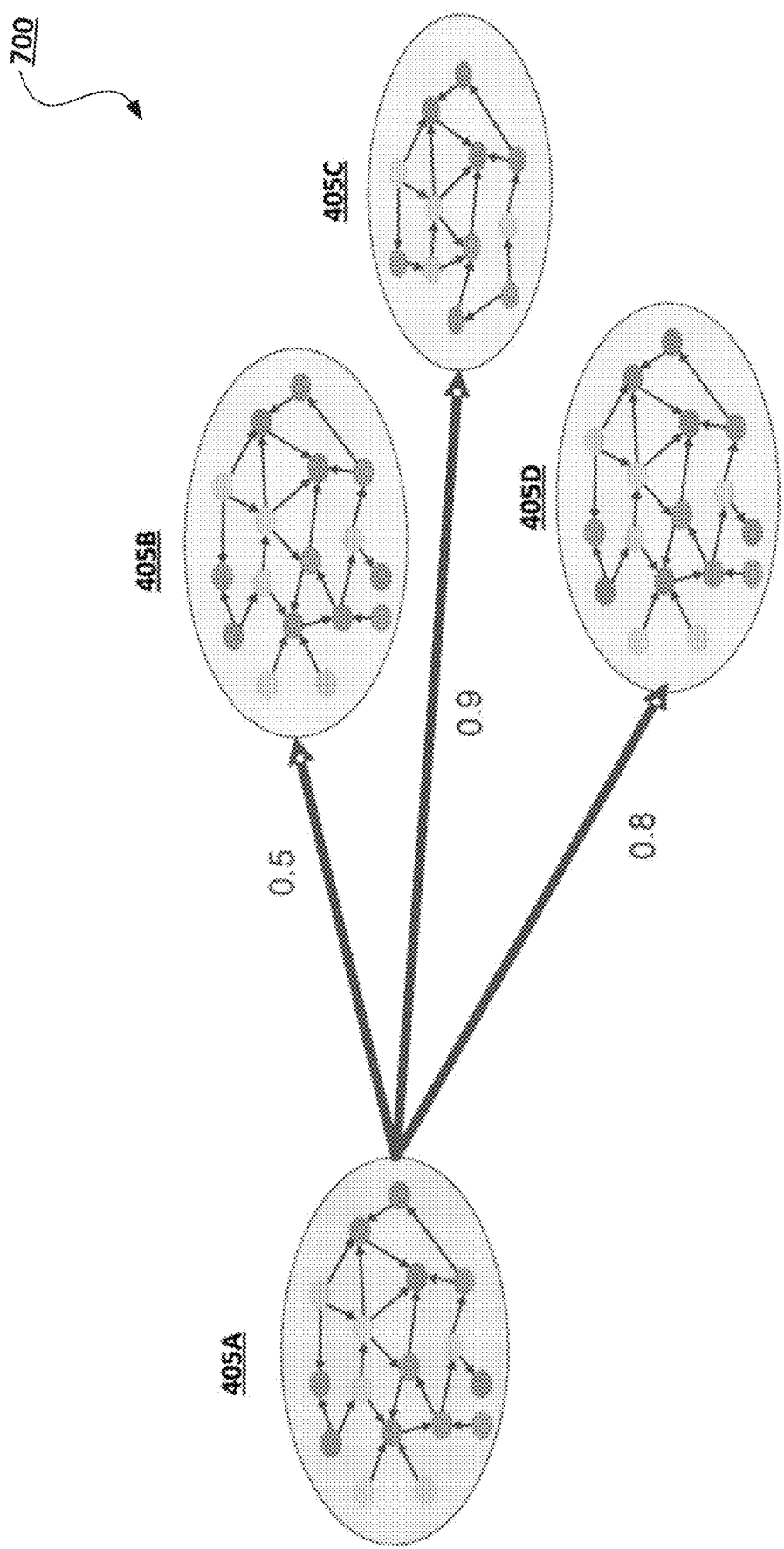
Figure 9:
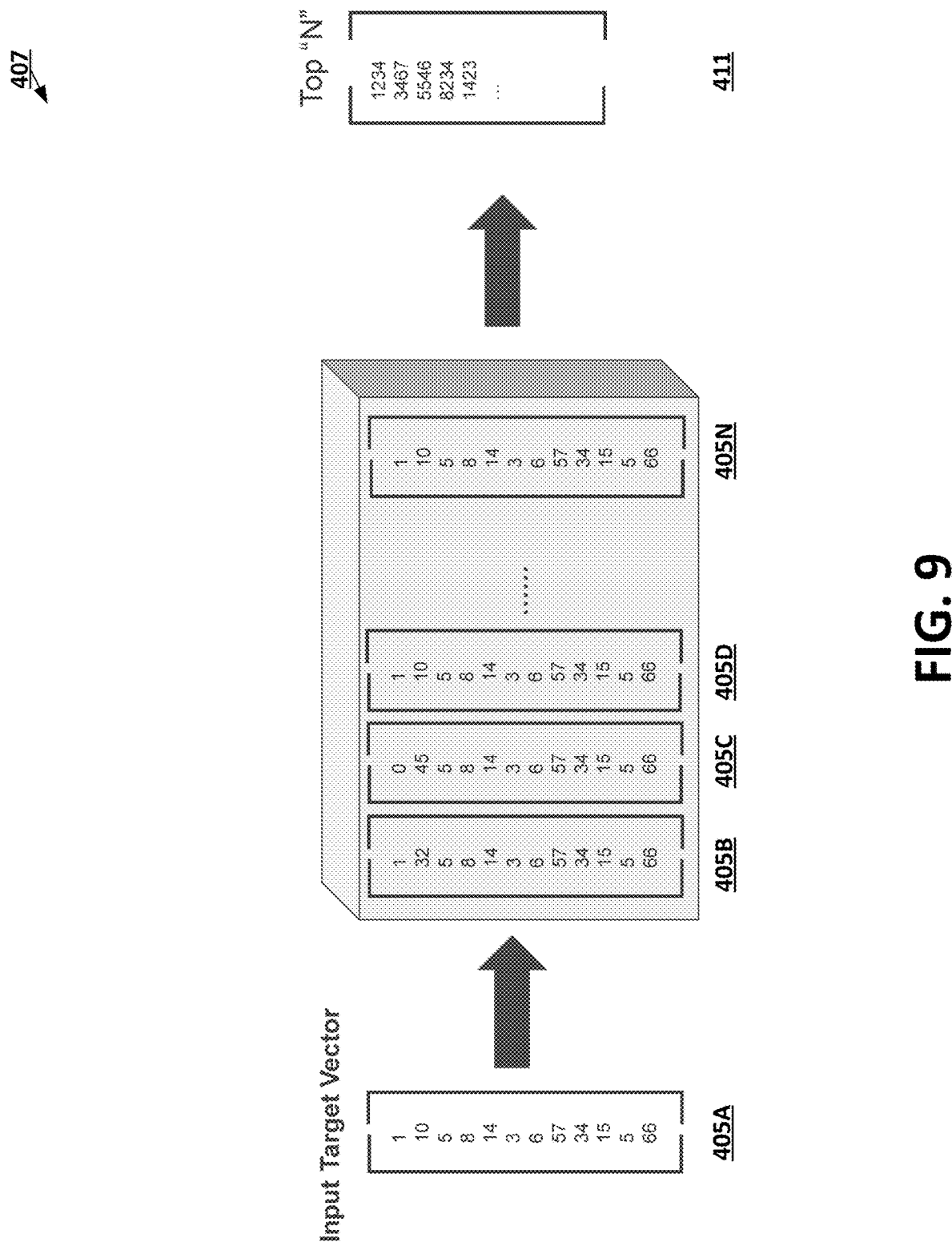
Figure 10:
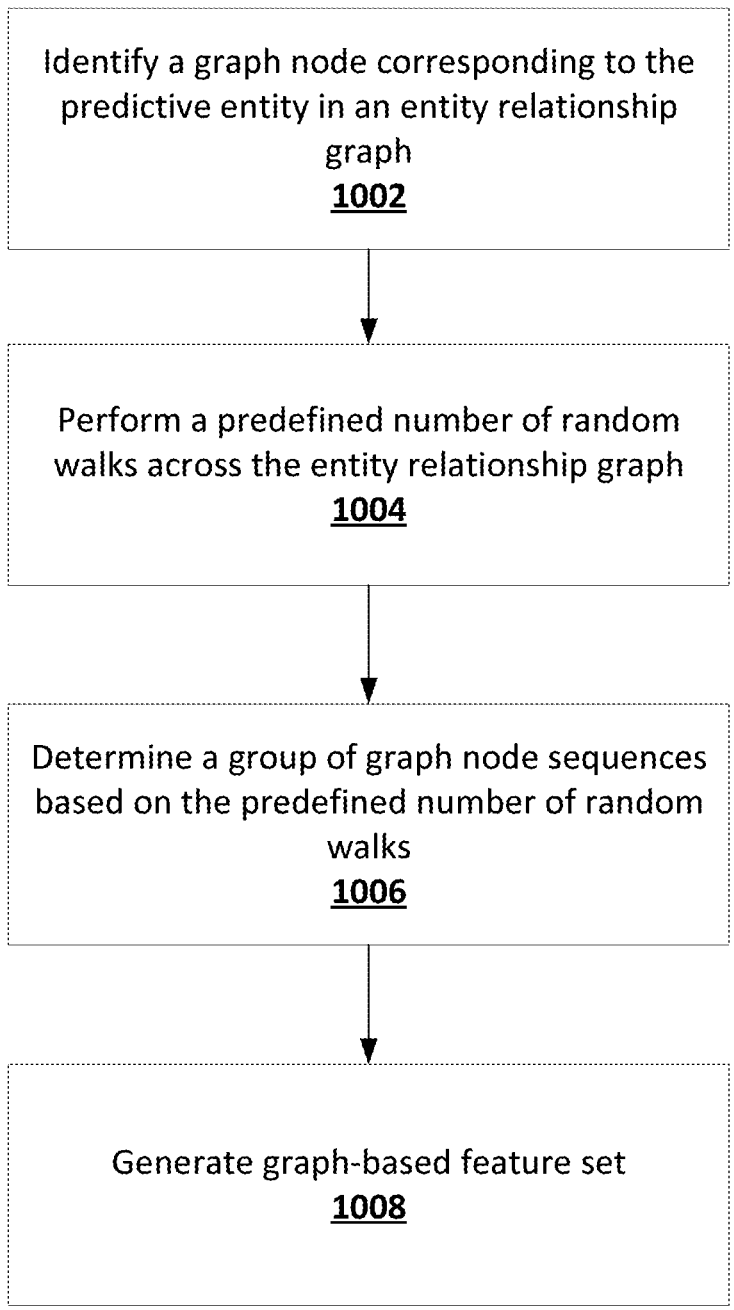

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example cross-entity similarity prediction computing entity in accordance with some embodiments discussed herein;

FIG. 3 provides an example external computing entity in accordance with some embodiments discussed herein;

FIG. 4 provides a diagram of an example architecture for determining a predicted cross-entity similarity measure output in accordance with some embodiments discussed herein;

FIG. 5 provides an operational example of an entity encoding machine learning model in accordance with some embodiments discussed herein;

FIG. 6 provides an operational example of a system architecture in accordance with some embodiments discussed herein;

FIG. 7 provides an operational example of determining a predicted cross-entity similarity measure output in accordance with some embodiments discussed herein;

FIG. 8 provides an operational example of a group of graph node sequences in accordance with some embodiments discussed herein;

FIG. 9 provides another operational example of similarity determination operations in accordance with some embodiments discussed herein;

FIG. 10 provides an example process for generating a graph-based feature set in accordance with some embodiments discussed herein; and FIG. 11 provides an operational example of a prediction output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention disclose techniques for performing predictive data analysis steps/operations that are configured to determine predicted cross-entity similarity measures between predictive entity pairs (e.g., between a first predictive entity and a second predictive entity), techniques that are in turn configured to improve the speed and efficiency of performing the noted predictive data analysis steps/operations and reliability of the generated results. Typically, predictive data analysis steps/operations are performed: for example, by determining predicted cross-entity similarity measure between predictive entity pairs sequentially (i.e., one at a time). Such operation are inadequate for processing large amounts of data in real-time (e.g., in response to real-time queries) in a fast and efficient manner. Additionally, existing techniques are time consuming and require a lot of computational resources.

There is a need for improved systems and methods configured to process large amounts of data, such as by determining a large number of predicted cross-entity similarity measures with respect to a plurality of predictive entities, in a fast and efficient manner. Thus, various embodiments of the present invention improve predictive analysis data steps/operations, for example, using graph-based processing techniques and parallel computing processing techniques (e.g., by enabling performance of similarity determinations across pairs of predictive data entities using field programmable gate arrays (FPGAs)). The inventors have confirmed, via experiments and theoretical calculations, that various embodiments of the disclosed techniques improve efficiency and accuracy of predictive data analysis systems and predictive data analysis relative to various state-of-the-art solutions by improving efficiency and reducing processing latency. In doing so, various embodiments of the present invention reduce the amount of processing time needed to perform similarity determinations across a large batch of predictive data entities.

Various embodiments of the present invention utilize predictive data analysis steps/operations (e.g., machine learning models and/or components, graph-based storage and processing techniques, embedding techniques and/or the like) in order to determine cross-entity similarity measures between respective predictive entity pairs of a plurality of predictive entities. Accordingly, prediction-based actions can be performed in real-time and on demand without overburdening available computational resources. In various examples, the techniques described herein may be used in a variety of domains in which an entity is compared to a plurality of entities and time-to-fix is critical. Example domains include log file error analysis, security scanner threat identification, helpdesk problem ticket resolution, search enablement and retrieval applications (e.g., document retrieval), and/or the like. In one example, the techniques described herein may be used to compare a log file to a plurality of log files in order to identify one or more most similar candidate log files.

By facilitating efficient and reliable performance of predictive data analysis steps/operations through enabling processing of large amounts of data, various embodiments of the present invention improve data retrieval efficiency as well as data storage efficiency of various data storage systems. For example, by utilizing the techniques described herein, efficiency and reliability of similarity determination steps/operations are provided. This in turn increases the efficiency and reliability of data retrieval steps/operations and/or data query processing steps/operations across various data storage systems, such as various data storage systems that act as a server devices in distributed client-server data storage architectures.

Accordingly, by utilizing some or all of the innovative techniques disclosed herein for performing predictive data analysis steps/operations, various embodiments of the present invention increase efficiency and accuracy of data storage steps/operations, data retrieval steps/operations, and/or query processing steps/operations across various data storage systems, such as various data storage systems that are part of client-server data storage architectures. In doing so, various embodiments of the present invention make substantial technical contributions to the field of database systems and substantially improve state-of-the-art data storage systems II. Definitions of Certain Terms The term "predictive entity" may refer to a data object that describes an entity with respect to which one or more predictive data analysis operations are performed. In some embodiments, a predictive entity may refer to a data object that describes a patient. An example predictive entity may correspond with an identifier (e.g., patient identifier such as patient name, member ID and/or the like). The example predictive entity may be associated with a data structure such as, for example, an entity relationship graph comprising a plurality of graph nodes (e.g., a network of graph nodes) associated with the predictive entity, in which each graph node corresponds with an identifier (e.g., one or more words, a string, and/or the like). The structure of the entity relationship graph may also correspond with or describe relationships between the graph nodes described therein. In some embodiments, at least one of the plurality of graph nodes may correspond with the identifier for the predictive entity. In some embodiments, a predictive entity may refer to a data object that describes a document, file, and the like.

The term "entity relationship graph" may refer to a data object or structure that describes relationships between a plurality of graph nodes (e.g., a network of graph nodes), where each graph node in at least a selected subset of the graph nodes may correspond to a predictive entity data object. The plurality of graph nodes may each be associated with the same predictive entity. As noted above, each graph node may correspond with an identifier and at least one of the graph nodes may correspond with an identifier for the predictive entity. For example, if the predictive entity refers to a patient, the identifier may be or comprise patient name, member ID and/or the like. By way of example, in an example data structure, a graph node may be denoted by a vertex, a point and or the like and a relationship between any two graph nodes may be represented by a connector (e.g., an edge, line or the like).

The term "entity encoding machine learning model" may refer to a data object that describes operations and/or parameters of a machine learning model that is configured to process a predictive entity in order to generate a predictive entity embedding for the predictive entity. An entity encoding machine learning model may comprise a plurality of machine learning models and/or machine learning model components. For example, an entity encoding machine learning model may comprise a graph node embedding sub-model and an embedding generation sub-model. An example entity encoding machine learning model may include one or more of a supervised machine learning model, convolutional neural network model, a language-based model, and/or the like.

The term "predictive entity embedding" may refer to a data object that describes a numerical (e.g., vector) representation of a predictive entity, where the numerical representation includes a value corresponding with each dimension of a multi-dimensional (e.g., an N-dimensional) embedding space. The example predictive entity embedding may be an output of an entity encoding machine learning model configured to process a data object describing a predictive entity. The example entity encoding machine learning model may determine each of the N dimensions of the N-dimensional embedding space by extracting a plurality of features from a data object storing information corresponding with the predictive entity. In the example of a patient, a data object corresponding with the predictive entity may include medical information/data. Medical information/data can include, without limitation, patient profile information/data (e.g., age, gender, demographic information/data) known health conditions, medical history, medication information/data, physiology information, genotype/gene expression information and/or the like.

The term "embedding generation sub-model" may refer to a data object that describes operations and/or parameters of a machine learning model component that is configured to process each graph-based entity embedding for a predictive entity of a plurality of predictive entities to generate a predictive entity embedding output for each predictive entity. An example of an embedding generation sub-model is a trained supervised machine learning model that is trained to process the graph-based entity embedding for a predictive entity of a plurality of predictive entities to generate a predictive entity embedding output for the predictive entity.

The term "graph-based feature set" may refer to a data object that describes a plurality of graph node sequences in which each sequence corresponds with the output of a random walk operation of a group of random walk operations performed across an entity relationship graph, where the group of random walk operations all begin at a graph node that corresponds to a predictive entity that is associated with the graph-based feature set. In some embodiments, a graph-based feature set may be determined based at least in part on a group of graph node sequences for the predictive entity that are determined based at least in part on a predefined number of random walks for the predictive entity.

The term "graph-based entity embedding" may refer to a data object that describes a numerical (e.g., vector) representation of a predictive entity that is generated based at least in part on processing a graph-based feature set for the predictive entity. In some embodiments, the graph-based entity embedding is the predictive output (e.g., intermediary output) of an entity encoding machine learning model, such as the output of a graph node embedding sub-model of an entity encoding machine learning model. The graph node embedding sub-model may be configured to process a graph-based feature set for a predictive entity in order to generate the graph-based entity embedding. A graph-based entity embedding may comprise a numerical representation in a multi-dimensional (e.g., an N-dimensional) embedding space corresponding with a particular predictive entity. In some embodiments, the graph-based entity embedding may be or comprise a predictive entity embedding. In some examples, the graph-based entity embedding may be the output of a trained Node2Vec machine learning model.

The term "graph node sequence" may refer to a data object that describes a recorded ordered sequence of visited graph nodes associated with a particular random walk operation performed across an entity relationship graph. In some embodiments, the random walk operation may begin from a graph node of the entity relationship graph that corresponds to the predictive entity. By way of example, an example entity relationship graph may comprise three graph nodes, for instance, "node A", "node B" and "node C." In the above example, "node A" may correspond with the predictive entity. A graph node sequence for the example entity relationship graph may be "A-C-B" or "A-B-C." In some embodiments, each graph node sequence may be a string of graph node identifiers.

The term "graph node embedding sub-model" may refer to a data object that describes operations and/or parameters of a machine learning model or component that is configured to process a plurality of graph node sequences in order to generate a numerical (e.g., vector) representation of the plurality of graph nodes corresponding with a predictive entity. An example of a graph-node embedding sub-model is a trained Node2Vec machine learning model. In some embodiments, the output of a graph node embedding sub-model may be further processed by an embedding generation sub-model in order to generate a final predictive output (e.g., a predictive entity embedding). In some embodiments, the graph node embedding sub-model may be configured to perform a predefined number of random walks across an entity relationship graph in order to generate a graph-based feature set describing a plurality of recorded graph node sequences each corresponding with a particular random walk. As such, each graph node sequence may comprise a string of identifiers corresponding with each visited graph node of the particular random walk.

The term "similarity determination machine learning model" may refer to a data object that describes operations and/or parameters of a machine learning model that is configured to generate a predictive output describing a predictive inference relating to similarity of two or more predictive entities based at least in part on predictive entity embeddings of the two or more predictive entities. The predictive inference may be an inference of a degree or measure of similarity between the two predictive entities. The operations of an example similarity determination machine learning model may comprise similarity determination operations such as cosine distance, Jaccard distance and/or the like. In some embodiments, the similarity determination machine learning model may be configured to process a first predictive entity embedding and a second predictive entity embedding in order to determine a predicted cross-entity similarity measure between the first and second predictive entity embeddings. In some embodiments, the similarity determination machine learning model may be configured to process a plurality of predictive entities in parallel in order to identify a subset of predictive entities that are most similar to a target predictive entity. By way of example, the similarity determination machine learning model may use a graphics processing unit, tensor processing unit, field programmable gate array (FPGA) and/or the like in order to process a plurality of predictive entities in parallel.

The term "predictive cross-entity similarity measure" may refer to a data object that describes a predictive output describing an inferred measure of similarity between a first predictive entity and a second predictive entity that is determined based at least in part on similarity determination operations performed by a similarity determination machine learning model. An example predictive cross-entity similarity measure for two predictive entities may be a distance measure between respective encoded representations (e.g., graph-based entity embeddings or predictive entity embeddings) corresponding with each predictive entity. An example predictive cross-entity similarity measure may be a value between 0 and 1, in which a value close to 0 indicates that the first predictive entity and the second predictive entity are less similar and in which a number close to 1 indicates that the first predictive entity and the second predictive entity are more similar (i.e., a predictive cross-entity similarity measure of 1 indicates that the first predictive entity and the second predictive entity are identical).

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis steps/operations and generating corresponding user interface data (e.g., for providing and/or updating a user interface). The system architecture 100 includes a cross-entity similarity prediction system 101 comprising a cross-entity similarity prediction computing entity 106 configured to generate predictive outputs that lead to performing one or more prediction-based actions. The cross-entity similarity prediction computing entity 106 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 may include a storage subsystem 108 configured to store at least a portion of the data utilized by the cross-entity similarity prediction computing entity 106. The cross-entity similarity prediction computing entity 106 may be in communication with one or more external computing entities 102. The cross-entity similarity prediction computing entity 106 may be configured to receive requests and/or data from external computing entities 102, process the requests and/or data to generate predictive outputs (e.g., predicted cross-entity similarity measure outputs), and provide the predictive outputs (e.g., predicted cross-entity similarity measure data objects) to the external computing entities 102. The external computing entity 102 (e.g., management computing entity) may periodically update/provide raw input data (e.g., predictive entity data objects) to the cross-entity similarity prediction computing entity 106. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the cross-entity similarity prediction computing entity 106 to perform predictive data analysis steps/operations and tasks. The storage subsystem 108 may be configured to store at least a portion of operational data and/or operational configuration data including operational instructions and parameters utilized by the cross-entity similarity prediction computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a cross-entity similarity prediction computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the cross-entity similarity prediction computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the cross-entity similarity prediction computing entity 106 may include or be in communication with a processing element 205 (also referred to as processors, processing circuitry, and/or similar terms used herein interchangeably) that communicate with other elements within the cross-entity similarity prediction computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), FPGAs, programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the cross-entity similarity prediction computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the cross-entity similarity prediction computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the cross-entity similarity prediction computing entity 106 with the assistance of the processing element 205 and operating system.

As indicated, in one embodiment, the cross-entity similarity prediction computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the cross-entity similarity prediction computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi®), Wi-Fi Direct®, 802.16 (WiMAX™), ultra-wideband (UWB), infrared (IR) protocols, near field communication (NFC) protocols, Wibree, Bluetooth® protocols, wireless universal serial bus (USB) protocols, and/or any other wireless protocol.

Although not shown, the cross-entity similarity prediction computing entity 106 may include or be in communication with one or more input elements, such as a keyboard input, a mouse input, a touch screen/display input, motion input, movement input, audio input, pointing device input, joystick input, keypad input, and/or the like. The cross-entity similarity prediction computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the cross-entity similarity prediction computing entity 106. In a particular embodiment, the external computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi®, Wi-Fi Direct®, WiMAX™, UWB, IR, NFC, Bluetooth®, USB, and/or the like. Similarly, the external computing entity 102 may operate in accordance with multiple wired communication standards and protocols, such as those described above with regard to the cross-entity similarity prediction computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi® access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi® access points, cellular towers, nearby computing devices (e.g., smartphones, laptops) and/or the like. For instance, such technologies may include the iBeacons, Gimbal proximity beacons, Bluetooth® Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the cross-entity similarity prediction computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the cross-entity similarity prediction computing entity 106 and/or various other computing entities.

In another embodiment, the external computing entity 102 may include one or more components or functionality that are the same or similar to those of the cross-entity similarity prediction computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Described herein are various techniques for predictive data analysis steps/operations in relation to at least a first predictive entity of a plurality of predictive entities and a second predictive entity of the plurality of predictive entities (i.e., one entity pair). Some of the disclosed techniques may utilize one or more machine learning models to perform predictive data analysis steps/operations that lead to performing one or more prediction-based actions. Some of the described techniques utilize a particular configuration of machine learning models, components, layers and/or the like. The output of a machine learning model, components, and/or layers therein may be supplied as an input for subsequent steps/operations by another machine learning model, component and/or layer. However, a person of ordinary skill in the art will recognize that predictive data analysis steps/operations discussed herein may be performed using different combinations of machine learning models/techniques than the particular combinations described herein. While some of the embodiments herein provide an example predictive entity that refers to a data object that describes a patient, it is noted that the scope of the present disclosure is not limited to such embodiments. In various embodiments, a predictive entity in accordance with the present disclosure may be in other forms. For example, an example predictive entity may refer to a data object that describes a document or a file (e.g., a log error file).

FIG. 4 provides an operational example 400 of a cross-entity similarity prediction computing entity 106. The cross-entity similarity prediction computing entity 106 is configured to perform a plurality of predictive steps/operations and tasks in order to generate one or more predictive outputs. The cross-entity similarity prediction computing entity 106 may comprise one or more units configured to perform predictive data analysis operations on a plurality of predictive entities to generate a predicted cross-entity similarity measure output 411 that can be used to perform one or more prediction-based actions. A predictive entity may be a data object that describes an entity with respect to which one or more predictive data analysis operations are performed. In some embodiments, a predictive entity may refer to a data object that describes a patient. An example predictive entity may correspond with an identifier of a real-world entity/person (e.g., patient identifier such as patient name, member ID and/or the like).

As depicted in FIG. 4, the cross-entity similarity prediction computing entity 106 comprises an entity encoding machine learning model 403 and a similarity determination machine learning model 407. As shown, the entity encoding machine learning model 403 is configured to process a first predictive entity data object 401A and a second predictive entity data object 401B to generate a first predictive entity embedding data object 405A and second predictive entity embedding data object 405B.

Referring now to FIG. 5, an operational example 500 of an entity encoding machine learning model 403 is provided. The entity encoding machine learning model 403 may refer to a data object that describes operations and/or parameters of a machine learning model that is configured to process a predictive entity in order to generate a predictive entity embedding for the predictive entity. The example entity encoding machine learning model 403 may include one or more of a supervised machine learning model, a convolutional neural network model, a language-based model, and/or the like. The example entity encoding machine learning model 403 may comprise a plurality of machine learning models and/or machine learning model components. For example, one or more machine learning model components of the example entity encoding machine learning model may determine each of the N dimensions (e.g., 200 dimensions)

of the N-dimensional embedding space by extracting a plurality of features from a data object storing information corresponding with the predictive entity. In some embodiments, the number of dimensions may be a configurable parameter, allowing for a variations in processing speed and precision. In the example of a patient, a data object corresponding with the predictive entity may include medical information/data. Medical information/data can include, without limitation, patient profile information/data (e.g., age, gender, demographic information/data) known health conditions, medical history, medication information/data, physiology information, genotype/gene expression information and/or the like.

As depicted, the entity encoding machine learning model 403 comprises a graph node embedding sub-model 501 and an embedding generation sub-model 503.

The graph node embedding sub-model 501 may be a machine learning model or component that is configured to process a plurality of graph node sequences in order to generate a unified numerical (e.g., vector) representation of the plurality of graph nodes corresponding with a predictive entity. An example of a graph-node embedding sub-model is a trained Node2Vec machine learning model. As depicted, the graph node embedding sub-model 501 is configured to process a predictive entity data object to generate a graph-based feature set 502. Subsequent to generating the graph-based feature set 502, the graph node embedding sub-model 501 is further configured to process the graph-based feature set 502 in order to generate a graph-based entity embedding output 504. The graph-based entity embedding output 504 may be the output of a trained Node2Vec machine learning model.

Referring now to FIG. 10, an example process 502A for generating a graph-based feature set by a graph node embedding sub-model 501 is provided.

Beginning at step/operation 1002, the graph node embedding sub-model 501 identifies a graph node corresponding to the predictive entity in an entity relationship graph. The entity relationship graph may refer to a data object or structure that describes relationships between a plurality of graph nodes (e.g., a network of graph nodes). The plurality of graph nodes may each be associated with the same predictive entity. In some embodiments, each graph node may correspond with an identifier and at least one of the graph nodes may correspond with an identifier for the predictive entity. For example, if the predictive entity refers to a patient, the identifier may be or comprise patient name, member ID and/or the like. By way of example, in an example data structure, a graph node may be denoted by a vertex, a point and or the like and a relationship between any two graph nodes may be represented by a connector (e.g., an edge, line or the like). In various embodiments, a network of graph nodes may describe other patients (e.g., patient identifiers) and/or medical information/data (e.g., clinician, medical facility) associated with the predictive entity.

At step/operation 1004, the graph node embedding sub-model 501 performs a predefined number of random walks across the entity relationship graph of the predictive entity, where each random walk begins at the graph node corresponding to the predictive entity. By way of example, each random walk may define a predefined number of hops between a plurality of graph nodes. In some embodiments, the predefined number of random walks may be a hyper-parameter of the graph node embedding sub-model 501. In some embodiments, random walk operations may be configured such that some features are more or less likely to be visited based at least in part on how common the feature is (e.g., a visiting likelihood).

As depicted, at step/operation 1006, the graph node embedding sub-model 501 determines a group of graph node sequences for each random walk based at least in part on the output of the random walk. A graph node sequence may refer to a data object that describes a recorded ordered sequence of visited graph nodes associated with a particular random walk operation performed across an entity relationship graph. An entity relationship graph for an example predictive entity may comprise a plurality of graph nodes (e.g., a network of graph nodes) associated with the predictive entity. For example, each graph node can correspond with an identifier or string. The structure of the entity relationship graph may also correspond with or describe relationships between the graph nodes described therein.

As noted above, an example random walk operation may begin from a graph node of the entity relationship graph that corresponds to the predictive entity. By way of example, an example entity relationship graph may comprise three graph nodes, for instance, "node A", "node B" and "node C." In the above example, "node A" may correspond with the predictive entity. A graph node sequence for the example entity relationship graph may be "A-C-B" or "A-B-C." In some embodiments, each graph node sequence may be a string of graph node identifiers.

As depicted, at step/operation 1008, the graph node embedding sub-model 501 generates the graph-based feature set. As noted above, the graph-based feature set may be a data object describing a plurality of graph node sequences in which each sequence corresponds with the output of a random walk operation of a group of random walk operations performed across an entity relationship graph, where the group of random walk operations all begin at a graph node that corresponds to a predictive entity that is associated with the graph-based feature set.

FIG. 8 provides an operational example 800 depicting graph node sequences in accordance with some embodiments of the present disclosure. As depicted, a first graph node sequence 702 defines a first string of patient identifiers, "5563242," "8154477," and "5334597" indicating a sequence of visited graph nodes associated with a first random walk. As further depicted a second graph node sequence 704 defines a second string of patient identifiers, "5334597," "7473556," and "6661920" indicating a sequence of visited graph nodes associated with a second random walk.

Returning to FIG. 5, as depicted, the graph node embedding sub-model 501 is configured to process a graph-based feature set 502 in order to generate a graph-based entity embedding output 504.

The graph-based entity embedding output 504 may be a data object that describes a numerical (e.g., vector) representation of a predictive entity that is generated based at least in part on processing a graph-based feature set for the predictive entity. An example graph-based entity embedding may be a predictive output (e.g., intermediary output) of the graph node embedding sub-model 501 of the entity encoding machine learning model 403. The graph-based entity embedding output 504 may be a numerical representation in a multi-dimensional (e.g., an N-dimensional) embedding space corresponding with a particular predictive entity.

As further depicted in FIG. 5, the example entity encoding machine learning model 403 comprises an embedding generation sub-model 503. The example embedding generation sub-model 503 may be a machine learning model component that is configured to process each graph-based entity embedding output 504 for a predictive entity of a plurality of predictive entities to generate a predictive entity embedding output 506 for each predictive entity. An example of an embedding generation sub-model 503 is a trained supervised machine learning model that is trained to process the graph-based entity embedding for a predictive entity of a plurality of predictive entities to generate a predictive entity embedding output for the predictive entity. As depicted, the embedding generation sub-model 503 is configured to process the graph-based entity embedding output in order to generate a predictive entity embedding output 506 for each predictive entity. Then, as depicted, the embedding generation sub-model 503 may generate a predictive entity embedding data object describing the predictive entity embedding output 506.

Returning to FIG. 4, as depicted, the similarity determination machine learning model 407 is configured to process the first predictive entity embedding data object 405A and the second predictive entity embedding data object 405B in order to generate a predicted cross-entity similarity measure output 411. The predictive entity embedding data objects 405A and 405B may be data objects that describe a numerical (e.g., vector) representation corresponding with a predictive entity, where the numerical representation includes a value corresponding with each dimension of a multi-dimensional (e.g., an N-dimensional) embedding space.

As noted above in regard to FIG. 4, the cross-entity similarity prediction computing entity 106 comprises a similarity determination machine learning model 407 configured to process the first predictive entity embedding data object 405A and the second predictive entity embedding data object 405B in order to generate a predicted cross-entity similarity measure output 411. The similarity determination machine learning model may be a data object that describes operations and/or parameters of a machine learning model that is configured to generate a predictive output describing a predictive inference relating to similarity of two or more predictive entities based at least in part on predictive entity embeddings of the two or more predictive entities. The predictive inference may be an inference of a degree or measure of similarity between the two predictive entities. The operations of an example similarity determination machine learning model may comprise similarity determination operations such as cosine distance, Jaccard distance and/or the like. In various embodiments, the similarity determination machine learning model is configured to perform similarity determination operations with respect to a first (i.e., target) predictive entity and a plurality of predictive entities. The example predictive cross-entity similarity measure for two predictive entities may be a distance measure between respective encoded representations (e.g., graph-based entity embeddings or predictive entity embeddings) corresponding with each predictive entity. An example predictive cross-entity similarity measure may be a value between 0 and 1, in which a value close to 0 indicates that the first predictive entity and the second predictive entity are less similar and in which a number close to 1 indicates that the first predictive entity and the second predictive entity are more similar (i.e., a predictive cross-entity similarity measure of 1 indicates that the first predictive entity and the second predictive entity are identical).

FIG. 7 provides an operational example 700 for generating a predicted cross-entity similarity measure output. As depicted, the similarity determination machine learning model 407 identifies a first predictive entity embedding data object 405A and a second predictive entity embedding data object 405B. As noted above, the similarity determination machine learning model 407 performs one or more similarity determination operations with respect to the first predictive entity embedding data object 405A and the second predictive entity embedding data object 405B in order to determine a cross-entity similarity measure output between the first predictive entity embedding data object 405A and the second predictive entity embedding data object 405B. For example, as depicted, the cross-entity similarity measure output between the first predictive entity embedding data object 405A and the second predictive entity embedding data object 405B is 0.5.

As further depicted, the similarity determination machine learning model 407 identifies a third predictive entity embedding data object 405C. The similarity determination machine learning model 407 performs one or more similarity determination operations with respect to the first predictive entity embedding data object 405A and the third predictive entity embedding data object 405C in order to determine a cross-entity similarity measure output between the first predictive entity embedding data object 405A and a third predictive entity embedding data object 405C. As depicted, the cross-entity similarity measure output between the first predictive entity embedding data object 405A and the third predictive entity embedding data object 405C is 0.9.

As further depicted, the similarity determination machine learning model 407 identifies a fourth predictive entity embedding data object 405D. The similarity determination machine learning model 407 performs one or more similarity determination operations with respect to the first predictive entity embedding data object 405A and the fourth predictive entity embedding data object 405D in order to determine a cross-entity similarity measure output between the first predictive entity embedding data object 405A and a fourth predictive entity embedding data object 405D. As depicted, the cross-entity similarity measure output between the first predictive entity embedding data object 405A and the fourth predictive entity embedding data object 405D is 0.8.

Accordingly, in the above example depicted in FIG. 7, the first predictive entity embedding data object 405A is most similar to the third predictive entity embedding data object 405C and the first predictive entity embedding data object 405A is least similar to the second predictive entity embedding data object 405B.

In some examples, the plurality of predictive entities may be in the order of tens or hundreds of millions of predictive entities. In some embodiments, the similarity determination machine learning model may be configured to process a plurality of predictive entities in parallel in order to identify a subset of predictive entities that are most similar to a target predictive entity. By way of example, the similarity determination machine learning model may use one or more graphics processing units, tensor processing units, FPGAs, combinations thereof, and/or the like in order to process the plurality of predictive entities (e.g., perform similarity determination operations with respect to each entity pair of the plurality of predictive entities) in parallel.

Referring now to FIG. 6, another operational example 600 of a cross-entity similarity prediction computing entity 106 is provided. As depicted, each of the entity encoding machine learning model 403 and the similarity determination machine learning model 407 may be embodied as one or more computing entities, devices, units, and/or the like in electronic communication with one another such that the entity encoding machine learning model 403 and the similarity determination machine learning model 407 can transmit and receive data/information from one another. In some embodiments, as shown, the entity encoding machine learning model 403 comprises one or more graph databases configured to store at least a portion of the data required for steps/operations of the entity encoding machine learning model 403. In some embodiments, as shown, the similarity determination machine learning model 407 comprises one or more FPGA units configured to perform required steps/operations of the similarity determination machine learning model 407 using parallel processing techniques. For example, each FPGA unit may be configured to perform similarity determinations operations between a set of pairs of predictive data entities based on the respective predictive entity embedding data objects for each pair. Additionally, in some embodiments, the one or more FPGA units may store at least a portion of the data required for steps/operations of the similarity determination machine learning model 407.

Referring now to FIG. 9, another operational example 407 depicting cross-entity similarity prediction steps/operations is provided.

As depicted, the cross-entity similarity prediction system identifies a first (i.e., target) predictive entity embedding data object 405A. A plurality of cross-entity similarity determinations across entity pairs are performed such that a predicted cross-entity similarity measure is determined for each respective entity pair. For example, as depicted, the entity pairs may be 405A and 405B, 405A and 405C, 405A and 405D . . . 405A and 405N. In some embodiments, each predicted cross-entity similarity measure determination may be performed using an FPGA unit of a plurality of FPGA units. For example, each FPGA unit of the plurality of FPGA units may be configured to perform cross-entity similarity determinations across an entity pair of one or more entity pairs in parallel. As depicted, subsequent to performing cross-entity similarity determinations for the plurality of predictive entities, one or more prediction-based actions based at least in part on the predicted cross-entity similarity measures can be performed. For example, as shown, the predicted cross-entity similarity measure output 411 describes a top N most similar predictive entities to the first (i.e., target) predictive entity embedding data object 405A.

In various embodiments, the cross-entity similarity prediction computing entity 106 may be configured to respond to queries for and/or trigger generation (e.g., by an external computing entity 102) of user interface data (e.g., messages, data objects and/or the like) corresponding with predictive outputs. An external computing entity 102 may provide the user interface data for presentation by a user computing entity. The user interface data may correspond with an associated workflow and or one or more queues generated for presentation to an end user.

A queue may refer to an ordering of a plurality of data objects describing predictive entities based at least in part on a portion of the predictive outputs described herein. In some embodiments, cross-entity similarity prediction computing entity 106 may be configured to generate one or more API-based data objects corresponding with at least a portion of the predictive outputs and/or the one or more queues. The cross-entity similarity prediction computing entity 106 may provide (e.g., transmit, send) the one or more API-based data objects representing at least a portion of the predictive outputs and/or the one or more queues to an end user interface (e.g., an investigation agent user interface) for display and/or further steps/operations. The predictive outputs may be used to dynamically update the user interface operated by an end user (e.g., a clinician) or generate user interface data in response to queries.

FIG. 11 provides an operational example showing a prediction output user interface 1100 that may be generated based at least in part on user interface data which is in turn generated based at least in part on the above-described predictive outputs. The external computing entity 102 may generate the user interface data and present (e.g., transmitted, sent and/or the like) corresponding user interface data for presentation by the prediction output user interface 1100. The user interface data may be used for dynamically updating the prediction output user interface 1100. In some embodiments, the prediction output user interface 1100 may dynamically update the display on a continuous or regular basis or in response to certain triggers.

As depicted in FIG. 11, the user interface data may describe a patient profile. The patient profile may be a data object storing and/or providing access to patient information/data. The patient record/profile may also comprise member information/data, patient features, and/or similar words used herein interchangeably that can be associated with a given member, claim, and/or the like. In some embodiments, patient information/data can include age, gender, poverty rates, known health conditions, home location, profession, access to medical care, medical history, claim history, patient identifier (ID), and/or the like. Patient information/data may also include marital status, employment status, employment type, socioeconomic information/data (e.g., income information/data), relationship to the primary insured, insurance product information/data, insurance plan information/data, member classifications, language information/data, and/or the like. As depicted, the prediction output user interface 1100 is configured to provide predictive outputs describing the top "N" similar patients to a target patient. The prediction output user interface 1100 may also comprise data object(s) storing and/or providing access to patient information/data for each of the top "N" (e.g., 100) most similar patients.

The prediction output user interface 1100 may comprise various features and functionalities for accessing, and/or viewing user interface data. The prediction output user interface 1100 may also comprise messages to an end-user in the form of banners, headers, notifications, and/or the like. As will be recognized, the described elements are provided for illustrative purposes and are not to be construed as limiting the dynamically updatable interface in any way.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and based on a group of graph node sequences from a predefined number of random walks across an entity relationship graph corresponding to a first predictive entity and a second predictive entity, a graph-based feature set;

generating, by the one or more processors and by processing the graph-based feature set using a graph node embedding machine learning model, a first graph-based entity embedding for the first predictive entity and a second graph-based entity embedding for the second predictive entity;

generating, by the one or more processors and by processing the first graph-based entity embedding and the second graph-based entity embedding using an entity encoding machine learning model, a first predictive entity embedding and a second predictive entity embedding, wherein the first predictive entity embedding and the second predictive entity embedding each comprise one or more values corresponding to each dimension of a multidimensional embedding space;

determining, by the one or more processors and using a similarity determination machine learning model to process the first predictive entity embedding and the second predictive entity embedding, a predicted cross-entity similarity measure;

updating, by the one or more processors, a queue of a plurality of data objects to include a predictive data object describing the second predictive entity, wherein the plurality of data objects are included in the queue according to a cross-entity similarity measure condition;

generating, by the one or more processors, at least one API-based data object corresponding to at least a portion of the queue; and transmitting, by the one or more processors, the at least one API-based data object to an end user interface.

2. The computer-implemented method of claim 1, wherein:

the entity encoding machine learning model comprises a graph node embedding sub-model and an embedding generation sub-model, and the embedding generation sub-model is configured to process each graph-based entity embedding for a corresponding predictive entity to generate a corresponding predictive entity embedding for the corresponding predictive entity.

3. The computer-implemented method of claim 2, wherein the embedding generation sub-model comprises a trained supervised machine learning component.

4. The computer-implemented method of claim 1, wherein the graph node embedding machine learning model comprises a trained Node2Vec machine learning component.

5. The computer-implemented method of claim 1, wherein determining the predicted cross-entity similarity measure is performed using a field-programmable gate array (FPGA) unit of a plurality of FPGA units.

6. The computer-implemented method of claim 5, wherein:

an FPGA unit of the plurality of FPGA units is configured to perform cross-entity similarity determinations across an entity pair comprising the first predictive entity and the second predictive entity.

7. The computer-implemented method of claim 1, wherein each predictive entity corresponds to a patient identifier of a plurality of patient identifiers.

8. A system comprising:

one or more processors and at least one memory storing processor-executable instructions that, when executed by any one or more of the one or more processors, cause the one or more processors to perform operations comprising:

generating, based on a group of graph node sequences from a predefined number of random walks across an entity relationship graph corresponding to a first predictive entity and a second predictive entity, a graph-based feature set;

generating, by processing the graph-based feature set using a graph node embedding machine learning model, a first graph-based entity embedding for the first predictive entity and a second graph-based entity embedding for the second predictive entity;

generating, by processing the first graph-based entity embedding and the second graph-based entity embedding using an entity encoding machine learning model, a first predictive entity embedding and a second predictive entity embedding, wherein the first predictive entity embedding and the second predictive entity embedding each comprise one or more values corresponding to each dimension of a multidimensional embedding space;

determining, using a similarity determination machine learning model to process the first predictive entity embedding and the second predictive entity embedding, a predicted cross-entity similarity measure;

updating a queue of a plurality of data objects to include a predictive data object describing the second predictive entity, wherein the plurality of data objects are included in the queue according to a cross-entity similarity measure condition;

generating at least one API-based data object corresponding to at least a portion of the queue; and transmitting the at least one API-based data object to an end user interface.

9. The system of claim 8, wherein:

the entity encoding machine learning model comprises a graph node embedding sub-model and an embedding generation sub-model, and the embedding generation sub-model is configured to process each graph-based entity embedding for a corresponding predictive entity to generate a corresponding predictive entity embedding for the corresponding predictive entity.

10. The system of claim 9, wherein the embedding generation sub-model comprises a trained supervised machine learning component.

11. The system of claim 8, wherein the graph node embedding machine learning model comprises a trained Node2Vec machine learning component.

12. The system of claim 8, wherein determining the predicted cross-entity similarity measure is performed using an FPGA unit of a plurality of FPGA units.

13. The system of claim 12, wherein:

an FPGA unit of the plurality of FPGA units is configured to perform cross-entity similarity determinations across an entity pair comprising the first predictive entity and the second predictive entity of one or more entity pairs.

14. The system of claim 8, wherein each predictive entity corresponds to a patient identifier of a plurality of patient identifiers.

15. One or more non-transitory computer-readable storage media storing processor-executable instructions that, when executed by one or more processors, cause the one or more processors to perform operations comprising:

generating, based on a group of graph node sequences from a predefined number of random walks across an entity relationship graph corresponding to a first predictive entity and a second predictive entity, a graph-based feature set;

generating, by processing the graph-based feature set using a graph node embedding machine learning model, a first graph-based entity embedding for the first predictive entity and a second graph-based entity embedding for the second predictive entity;

generating, by processing the first graph-based entity embedding and the second graph-based entity embedding using an entity encoding machine learning model, a first predictive entity embedding and a second predictive entity embedding, wherein the first predictive entity embedding and the second predictive entity embedding each comprise one or more values corresponding to each dimension of a multidimensional embedding space;

determining, using a similarity determination machine learning model to process the first predictive entity embedding and the second predictive entity embedding, a predicted cross-entity similarity measure;

updating a queue of a plurality of data objects to include a predictive data object describing the second predictive entity, wherein the plurality of data objects are included in the queue according to a cross-entity similarity measure condition;

generating at least one API-based data object corresponding to at least a portion of the queue; and transmitting the at least one API-based data object to an end user interface.

16. The one or more non-transitory computer-readable storage media of claim 15, wherein:

the entity encoding machine learning model comprises a graph node embedding sub-model and an embedding generation sub-model, and the embedding generation sub-model is configured to process each graph-based entity embedding for a corresponding predictive entity to generate a corresponding predictive entity embedding for the corresponding predictive entity.

17. The one or more non-transitory computer-readable storage media of claim 16, wherein the embedding generation sub-model comprises a trained supervised machine learning component.

18. The one or more non-transitory computer-readable storage media of claim 15, wherein the graph node embedding machine learning model comprises a trained Node2Vec machine learning component.

19. The one or more non-transitory computer-readable storage media of claim 15, wherein determining the predicted cross-entity similarity measure is performed using an FPGA unit of a plurality of FPGA units.

20. The one or more non-transitory computer-readable storage media of claim 19, wherein:

an FPGA unit of the plurality of FPGA units is configured to perform cross-entity similarity determinations across an entity pair comprising the first predictive entity and the second predictive entity.

* * * * *

UNITED STATES PATENT AND TRADEMARK OFFICE
CERTIFICATE OF CORRECTION

Page 1 of 1

PATENT NO. : 12,353,964 B2
APPLICATION NO. : 17/302481
DATED : July 8, 2025
INVENTOR(S) : Daniel G. McCreary et al.

It is certified that error appears in the above-identified patent and that said Letters Patent is hereby corrected as shown below:

In the Claims

In Column 24, Line 55, Claim 13, delete "entity of one or more entity pairs." and insert -- entity. --, therefor.

Signed and Sealed this
Twenty-fifth Day of November, 2025

John A. Squires
*Director of the United States Patent and Trademark Office*